United States Patent
Chang

[19]

[11] Patent Number: 6,070,419
[45] Date of Patent: Jun. 6, 2000

[54] COOL AIR EXHALING APPARATUS IN ENFORCED CIRCULATION TYPE REFRIGERATOR AND CONTROL METHOD THEREOF

[75] Inventor: Eui-young Chang, Kyonggi-do, Rep. of Korea

[73] Assignee: Samsung Electronics Co., Ltd., Kyungki-do, Rep. of Korea

[21] Appl. No.: 09/306,571

[22] Filed: May 6, 1999

Related U.S. Application Data

[62] Division of application No. 08/991,209, Dec. 16, 1997.

[30] Foreign Application Priority Data

Dec. 16, 1997 [KR] Rep. of Korea .................. 96-66371

[51] Int. Cl.[7] ........................................................ F24F 9/00
[52] U.S. Cl. ................................................ 62/89; 62/408
[58] Field of Search .............................. 62/186, 187, 407, 62/441, 89, 447, 408

[56] References Cited

U.S. PATENT DOCUMENTS 3,004,400 10/1961 Mann, et al. ........................ 62/441
3,252,292 5/1966 O'Connell, et al. ................. 62/441
5,765,388 6/1998 Jeon ..................................... 62/408
5,870,898 2/1999 Choi ..................................... 62/89

*Primary Examiner*—William Doerrler
*Attorney, Agent, or Firm*—Sughrue, Mion, Zinn Macpeak & Seas, PLLC

[57] ABSTRACT

A cool air exhaling apparatus in an enforced circulation type refrigerator and a control method thereof having a simple configuration so as to reduce manufacturing costs and to improve productivity, as well as freezing and refrigerating efficiency of foods. The cool air exhaling apparatus in an enforced circulation type refrigerator in which a cool air cooled by an evaporator is guided to a duct by operating a cool air circulating fan and is exhaled into the refrigerator through a cool air exhaling hollow formed in a duct cover, includes at least one cool air guide formed protrusively at the front of a duct cover in a width direction of the refrigerator, having a cool air exhaling hollow in its inner sidewall, and a duct thermal insulation material in which a cool air guide hollow having a convex curved side portion connected to the inner sidewall of the cool air guide is formed in sides of the duct cover. The cool air flows desirably along the cool air guide hollow without any separation and goes down in the vertical direction at the front of the shelf so as to form an air curtain. Thus, the cool air rarely flows outside even if the door is open, when operating the cool air circulating fan.

4 Claims, 8 Drawing Sheets

COOL AIR EXHALING APPARATUS IN ENFORCED CIRCULATION TYPE REFRIGERATOR AND CONTROL METHOD THEREOF

This is a divisional of application Ser. No. 08/991,209 filed Dec. 16, 1997, the disclosure of which is incorporated herein by reference.

BACKGROUND OF THE INVENTION

1. Field of the Invention

The present invention relates to a cool air exhaling apparatus in an enforced circulation type refrigerator and a control method thereof, and more particularly, to a cool air exhaling apparatus in an enforced circulation type refrigerator and a control method thereof having a simple configuration capable of reducing manufacturing costs and improving productivity as well as improving freezing and refrigerating efficiency of foods.

2. Description of the Related Art

Generally, a refrigerator for home use is an enforced circulation type refrigerator which forcibly circulates cool air produced by a flow of a refrigerant using a cool air exhaling apparatus having a cool air circulating fan, a duct, and the like, for freezing foods stored in a freezer compartment and maintaining the freshness of foods stored in a refrigerator compartment. A flow of a cool air in such an enforced circulation type refrigerator will be described with reference to the accompanying drawings.

FIG. 1 and FIG. 2 are longitudinal sectional views illustrating a flow of a cool air in an enforced circulation type refrigerator.

Referring to FIG. 1, evaporators 4 and 4' and cool air circulating fans 6 and 6' are respectively mounted in a freezer compartment 1 and a refrigerator compartment 1'. The cool air flowing from the cool air circulating fans 6 and 6'is exhaled into the inside of the freezer compartment 1 and the refrigerator compartment 1'through respective ducts 3 and 3'. In other words, the cool air produced by the evaporator 4 of the freezer compartment 1 is exhaled into the inside of the freezer compartment 1 by operating the cool air circulating fan 6 of the freezer compartment. Then, the cool air freezes foods stored in the freezer compartment 1 as the cool air circulates the freezer compartment 1, and is returned to the evaporator 4 again. In the same manner, the cool air produced by the evaporator 4' of the refrigerator compartment 1' is exhaled into the inside of the refrigerator compartment 1' by operating the cool air circulating fan 6' of the refrigerator compartment 1'. Then, the cool air lowers the temperature of the refrigerator compartment 1' to a predetermined temperature while circulating the refrigerator compartment 1', and is returned to the evaporator 4' again bypassing a vegetable box 7 at a lower portion of the refrigerator compartment 1.

Referring to FIG. 2, the evaporator 4 and the cool air circulating fan 6 are mounted in only the freezer compartment 1. The cool air which flowed out from the evaporator 4 in the freezer compartment 1 circulates the inside of the freezer compartment 1 and then returns to the evaporator 4 again along a cool air return path 8a formed in an intermediate thermal insulation wall 8. However, some of the cool air flowing out from the evaporator 4 goes down along the duct 3' and is exhaled into the inside of the refrigerator compartment 1'. Thus, the cool air circulates the inside of the refrigerator compartment 1' and is returned to the evaporator 4 again along a cool air return path 8b formed in the intermediate thermal insulation wall bypassing the vegetable box 7.

A duct thermal insulation material 9 prevents dew from forming on an outer wall of a duct cover due to the temperature difference between the cool air in the duct and the refrigerator compartment.

In the enforced circulation type refrigerator as aforementioned, a variety of cool air exhaling apparatuses have been suggested to evenly distribute the cool air at every place in the freezer compartment and the refrigerator compartment. As illustrated in FIG. 3, in general, a cool air exhaling apparatus has a duct 13 having a predetermined width formed at an intermediate portion of a rear wall of the freezer compartment and the refrigerator compartment to exhale the cool air from the rear. As illustrated in FIG. 4, another cool air exhaling apparatus has a structure with ducts 14 and 14' which are formed respectively at both sides of the freezer compartment and the refrigerator compartment to exhale the cool air from both ends of the ducts. Moreover, as illustrated in FIG. 5, another cool air exhaling apparatus has a structure with ducts 15 and 15' having a predetermined width formed at the intermediate portion of the rear wall of the freezer compartment and the refrigerator compartment and a shelf 16 having a cool air exhaling hollow 17 combined with the duct 15 so as to exhale the cool air through the shelf 16.

However, the conventional cool air exhaling apparatuses discussed above have several problems.

First, the conventional cool air exhaling apparatuses have a complicated configuration and assembly process. This increases manufacturing costs, reduces productivity and reduces refrigerating efficiency of foods. In other words, to form the cool air apparatuses shown in FIG. 4 and FIG. 5, components such as the duct body, the duct cover, and the shelf have to be mounted separately, which increase the manufacturing costs and reduce productivity due to undesirable assembly processes between the respective components. In addition, since such components complicate the passage of the cool air, a flow speed of the cool air is slowed down, thereby interfering with an even distribution of the cool air in the refrigerator and freezer compartments.

Furthermore, if a door of the freezer compartment or a door of the refrigerator compartment is open in the course of operating the cool air circulating fan, the cool air is likely to flow out through the open door. Thus, in the case of the door being open, the operation of the cool air circulating fan is stopped to prevent the cool air from flowing outside; however, this reduces the cooling efficiency of foods.

SUMMARY OF THE INVENTION

Accordingly, the present invention is directed to a cool air exhaling apparatus in a refrigerator and a control method thereof that substantially obviates one or more of the problems associated with the related art.

An object of the present invention is to provide a cool air exhaling apparatus in an enforced circulation type refrigerator and a control method thereof having a simple configuration capable of evenly distributing cool air in a refrigerator and, at the same time, reducing leakage of the cool air from the compartment even if a refrigerator door is open while the cool air circulating fan is operating, so that manufacturing costs can be reduced, and manufacturing productivity, freezing and refrigerating efficiency of foods, can be improved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a cool air exhaling apparatus in a refrigerator in which a cool air cooled by an evaporator is guided to a duct by operating a cool air circulating fan and is exhaled into the refrigerator through a cool air exhaling hollow formed in a duct cover, includes at least one cool air guide formed protrusively at the front of a duct cover in a width direction of the refrigerator, forming a cool air exhaling hollow in its inner sidewall, and a duct thermal insulation material which is formed inside of the duct cover in which a cool air guiding hollow having a convex curved side portion is connected to the inner sidewall of the cool air guide.

In the cool air exhaling apparatus of the present invention as aforementioned, an air curtain is formed at the front of the refrigerator to prevent the cool air in the refrigerator from flowing outside. In this respect, a control method of a cool air exhaling apparatus according to the present invention includes the steps of sensing a temperature in a refrigerator, turning off a compressor and a cool air circulating fan if the temperature in the refrigerator is lower than a predetermined temperature, turning on the compressor and the cool air circulating fan if the temperature in the refrigerator is higher than the predetermined temperature, and turning on the cool air circulating fan regardless of the temperature in the refrigerator in the event of opening a door of the refrigerator.

In another cool air exhaling apparatus in a refrigerator, rotation speed of a cool air circulating fan is variable between a first rotation speed and a second rotation speed higher than the first rotation speed. In the case that the cool air circulating fan is operated by the second rotation speed, an air curtain is formed at the front of the refrigerator. In this respect, a control method of the cool air exhaling apparatus includes the steps of sensing a temperature in a refrigerator, turning off a compressor and a cool air circulating fan if the temperature in the refrigerator is lower than a predetermined temperature, turning on the compressor and operating the cool air circulating fan at the first rotation speed if the temperature in the refrigerator is higher than the predetermined temperature, and operating the cool air circulating fan at the second rotation speed regardless of the temperature in the refrigerator if the refrigerator is opened.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
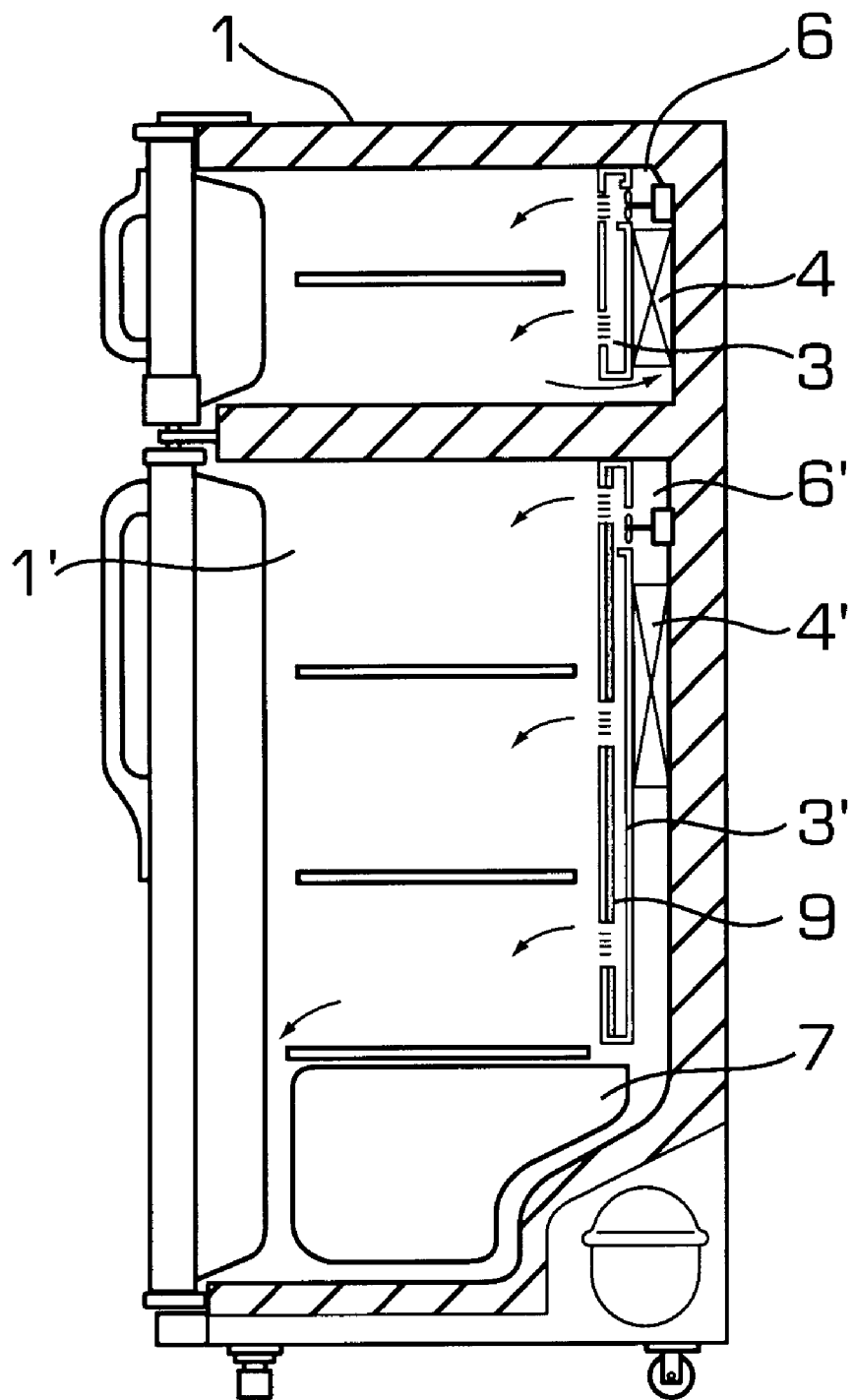
FIG. 1 and FIG. 2 are longitudinal sectional views illustrating a flow of a cool air in an enforced circulation type refrigerator.
Figure 2:
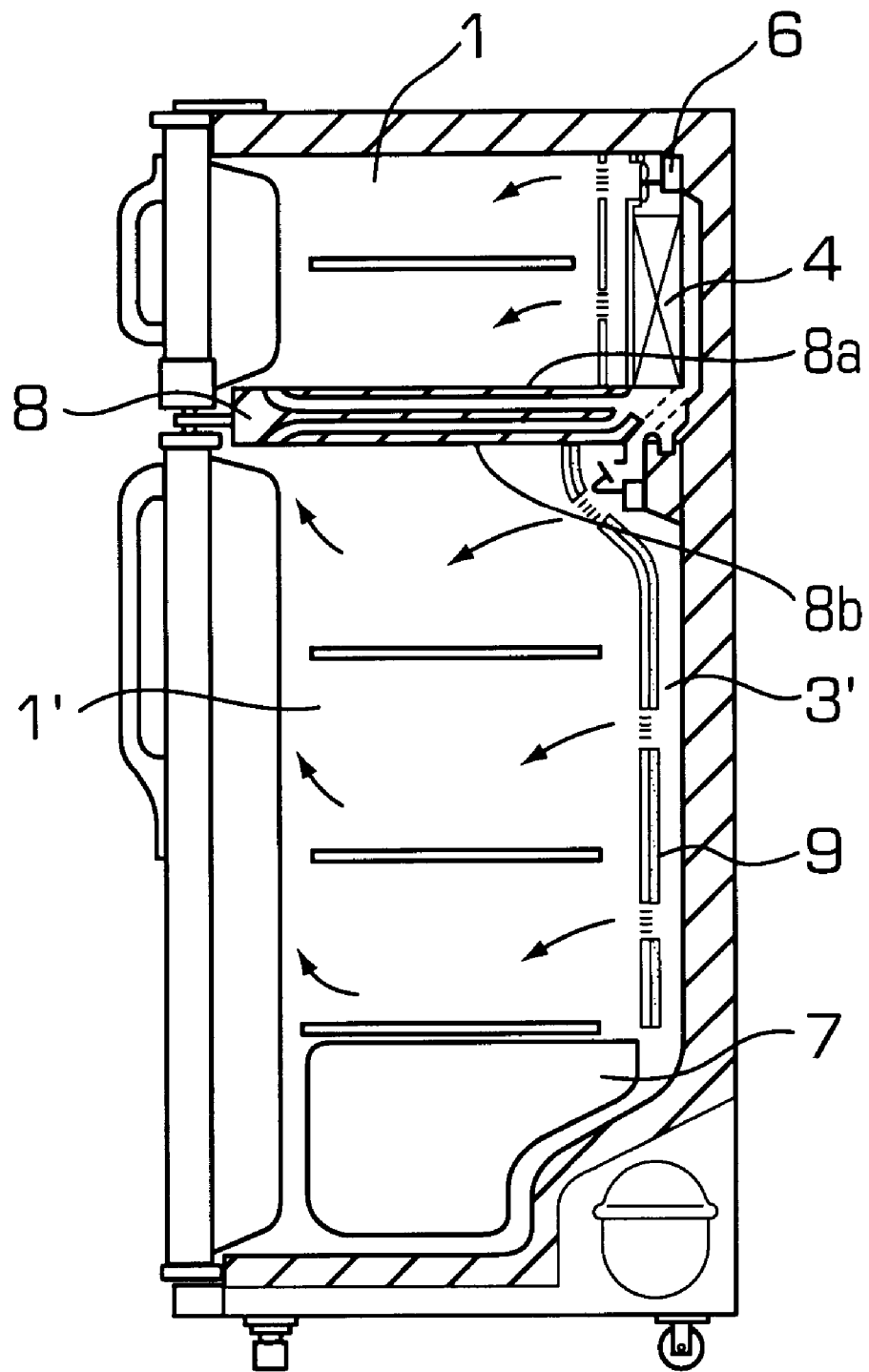
Figure 3:
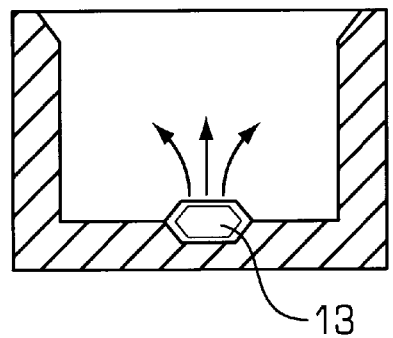
FIG. 3 to FIG. 5 are sectional views of main portions illustrating cool air exhaling structures in a conventional refrigerator.
Figure 4:
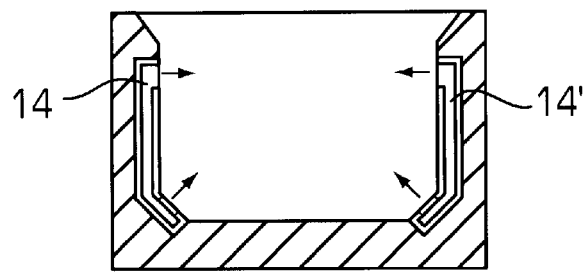
Figure 5:
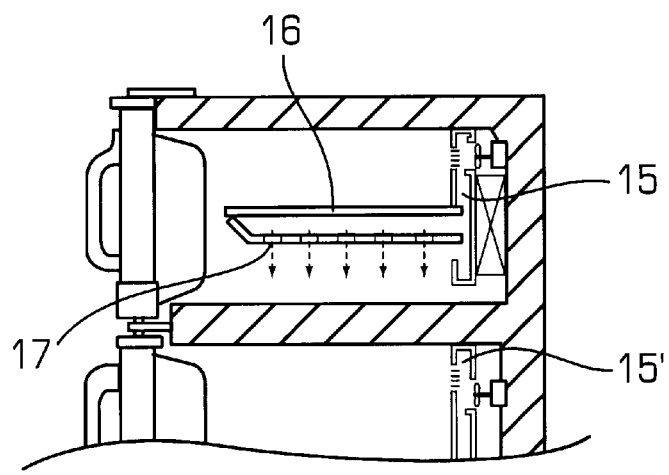
Figure 6:
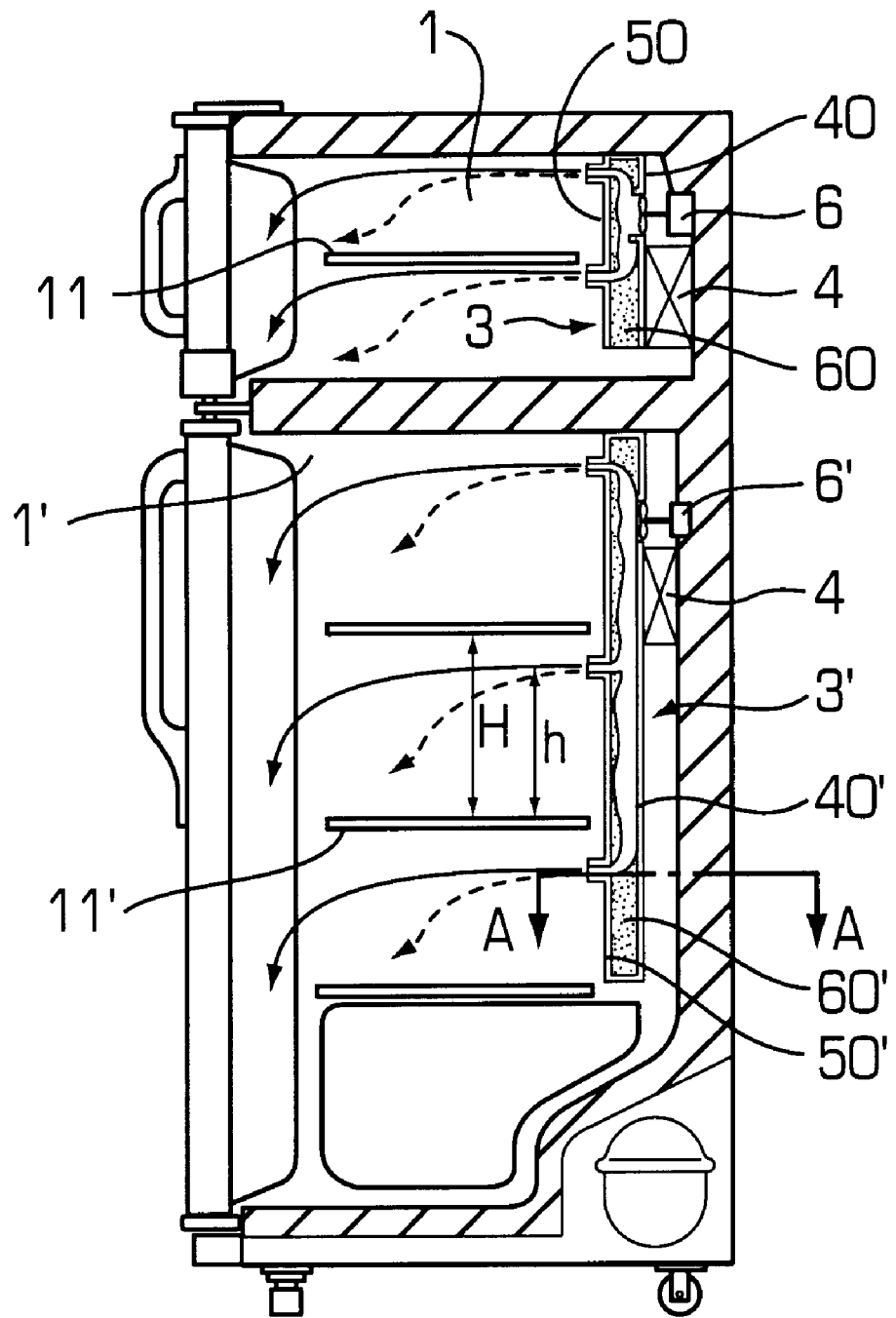
FIG. 6 is a longitudinal sectional view illustrating an example of a refrigerator to which a cool air exhaling apparatus is applied, according to the present invention.
Figure 7:
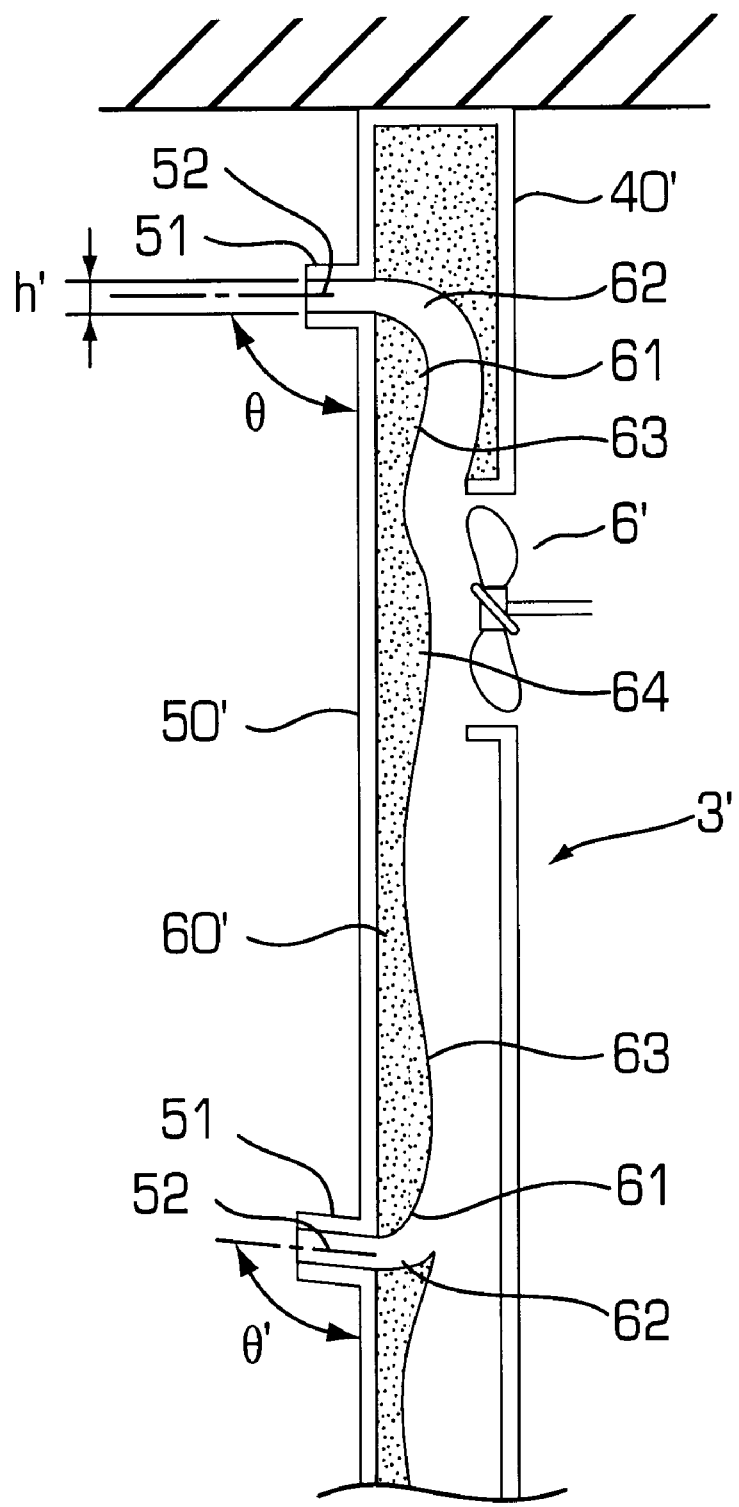
FIG. 7 is an enlarged view of a main portion of a cool air exhaling apparatus according to the present invention.
Figure 8:
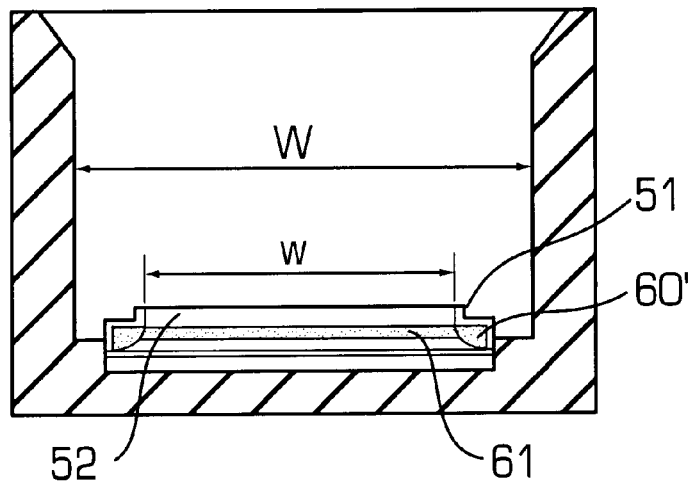
FIG. 8 is a sectional view taken along VIII—VIII line of FIG. 6.

FIG. 6 is a longitudinal sectional view illustrating an example of a refrigerator to which a cool air exhaling apparatus according to the present invention is applied. FIG. 7 is an enlarged view of a main portion of a cool air exhaling apparatus according to the present invention. FIG. 8 is a sectional view taken along VIII-VIII line of FIG. 6.

A refrigerator according to the present invention includes a main body having a freezer compartment 1 and a refrigerator compartment 1' divided into each other by an intermediate thermal insulation wall 8. Evaporators 4 and 4' are respectively mounted at the rear of the freezer compartment 1 and the refrigerator compartment 1'. In addition, cool air circulating fans 6 and 6', and ducts 3 and 3' are mounted at the rear of the freezer compartment 1 and the refrigerator compartment 1'. The ducts 3 and 3' exhale the cool air cooled by the evaporators 4 and 4' throughout the refrigerator. One or more shelves 11 and 11' are arranged in the respective compartments 1 and 1'.

The ducts 3 and 3' include duct bodies 40 and 40', duct covers 50 and 50' combined with the ducts 3 and 3' at the front of the duct bodies 40 and 40', and duct thermal insulation materials 60 and 60' mounted respectively between the duct bodies 40, 40' and the duct covers 50, 50' to limit the passage of the cool air.

Referring to FIG. 9, a cool air guide 51 is protrusively formed at the front of the duct covers 50 and 50' in a width direction of the refrigerator. The cool air guide 51 guides the cool air into the inside of the freezer compartment 1 and the refrigerator compartment 1'. A cool air exhaling hollow 52 is formed in an inner sidewall of the cool air guide 51. Thus, the cool air exhaling hollow 52 has a slot shape to guide the cool air to the front of the refrigerator along the width of the refrigerator.

Preferably, the cool air exhaling hollow 52 in the cool air guide 51 is arranged above the shelves 11, 11' at a height h, higher than half a height H between the respective storage spaces on the shelves 11 and 11' and its width w is wider than half a width W of the inside of the refrigerator.

The height h and the width w of the cool air exhaling hollow 52 depend on the position of the cool air circulating fan 6'. Likewise, a cool air exhaling angle θ depends on the position of the cool air circulating fan 6'. For example, as the cool air exhaling hollow 52 is positioned farther away from the cool air circulating fan 6' the flow of the cool air slows, thus it is desirable that the width w of the cool air exhaling hollow 52 gets wider, and the height h' gets lower, and the cool air exhaling angle θ gets greater.

Meanwhile, the duct thermal insulation materials 60 and 60' are mounted in inner sides of the duct covers 50 and 50'. In the conventional refrigerator, the duct thermal insulation material is mounted in inner sides of the duct cover of the refrigerator compartment. The conventional duct thermal insulation material is intended to prevent dew from forming on an outer wall of the duct cover due to temperature difference between the cool air in the duct and the refrigerator compartment. It is not intended to guide the cool air to the cool air exhaling hollow.

However, the duct thermal insulation materials 60 and 60' of the present invention is structured so that the cool air in the ducts desirably flows into the cool air exhaling hollow 52 using a Coanda effect. The Coanda effect permits the cool air to flow along a convex curved side. In the duct thermal insulation materials 60 and 60', the cool air guide hollow 62 is formed. The cool air guide hollow 62 has a convex curved portion 61 which is smoothly connected to the cool air exhaling hollow 52. The cool air exhaling hollow 52 has a slot shape and is formed by the cool air guide 51. In order to allow the length of the cool air guide hollow 62 to be sufficiently long and, at the same time, to desirably flow the cool air into the duct, a projection portion 63 having a more convex protrusive shape than the other portions is formed around the cool air guide hollow 62.

Since the cool air guide hollow 62 and the cool air exhaling hollow 52 are formed as above, the air cooled by the evaporators 4 and 4' flows along the cool air guide hollow 62 without separation due to the Coanda effect as the cool air circulating fans 6 and 6' operate. Thus, as denoted by solid arrows in FIG. 6, the cool air is exhaled almost in laminar flow through the cool air exhaling hollow 52 and flows down the front of the shelf in the vertical direction to form an air curtain. As a result, the cool air rarely flows outside even, if the door of the refrigerator is open.

Figure 9A:
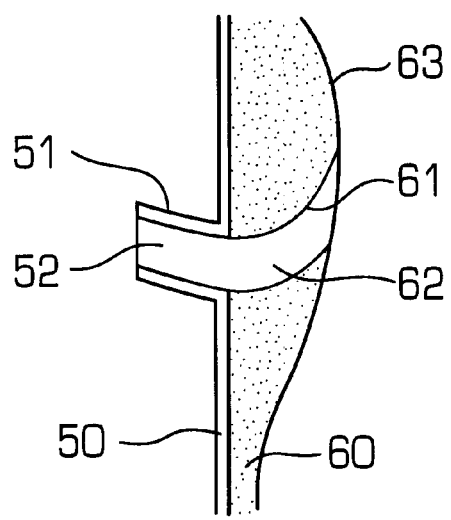
FIG. 9A and FIG. 9B show embodiments of a cool air exhaling apparatus according to the present invention.
Figure 9B:
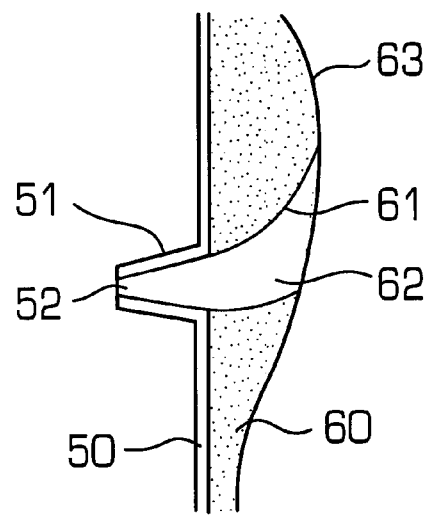

In the above embodiment, the inner sidewall of the cool air guide 51, i.e., the cool air exhaling hollow 52, may have a curved section to be smoothly connected to the curved side of the cool air guide hollow 62, as illustrated in FIG. 9A. Also, as illustrated in FIG. 9B, it may have a nozzle shaped section so that the outflow portion of the cool air is narrower than its inflow portion thereby improving the exhaling characteristic of the cool air.

Furthermore, the cool air circulating fans 6 and 6' have a two step rotation speed. In one step the cool air circulating fans 6 and 6' are ordinarily operated at a low rotation speed to flow the cool air, as denoted by dotted arrows in FIG. 6. In the other step the cool air circulating fans 6 and 6' are operated at a high rotation speed to form an air curtain at the front of the shelf if the door of the refrigerator is open.

Projection portion 64 evenly distributes the cool air flowed into the duct by the cool air circulating fan.

Although the enforced circulation type refrigerator having the evaporators respectively in the freezer compartment and the refrigerator compartment has been described in the embodiment of the present invention as aforementioned, it would have been obvious to the skilled person that the cool air exhaling apparatus of the present invention may be applied to the enforced circulation type refrigerator having one evaporator, which cools the freezer compartment and the refrigerator compartment.

The operation of the cool air exhaling apparatus of the refrigerator according to the present invention and a control method thereof now will be described with reference to FIG. 10 and FIG. 11.

Figure 10:
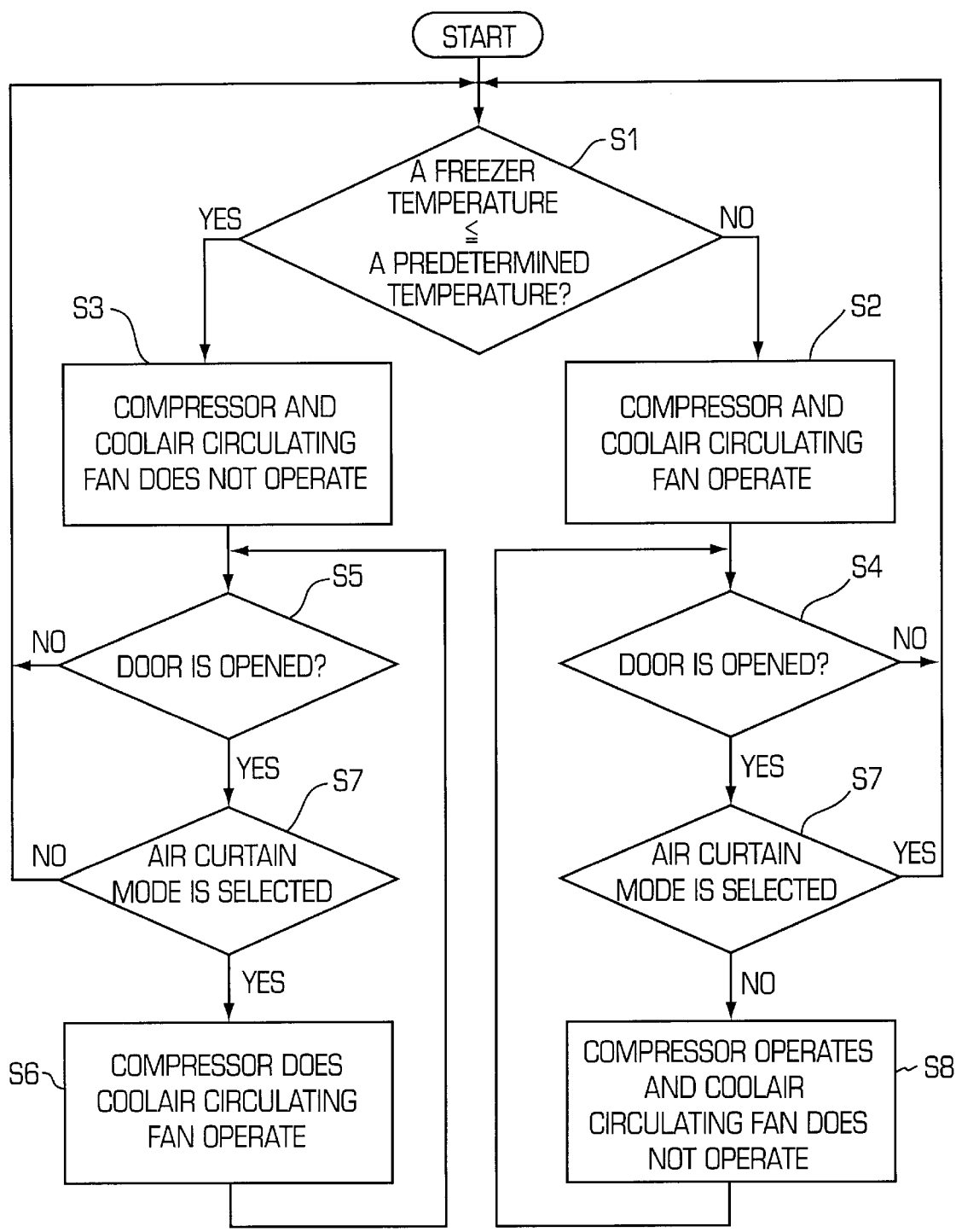
FIG. 10 is a flow chart illustrating an embodiment of a control method of a cool air exhaling apparatus according to the present invention.

FIG. 10 is a flow chart illustrating an embodiment of a control method of a cool air exhaling apparatus according to the present invention. In this embodiment, the cool air circulating fans 6 and 6' have a rotation speed of one step.

First, a temperature TR of the freezer compartment or the refrigerator compartment is sensed and then is compared with a predetermined temperature TS in step S1. If the temperature TR of the refrigerator is higher than the predetermined temperature TS, the compressor is operated to produce the cool air by the evaporator and, at the same time, the cool air circulating fan is operated to circulate the cool air in the refrigerator so as to cool the inside of the refrigerator in step S2. If the temperature in the refrigerator is lowered to the predetermined temperature, the compressor and the cool air circulating fan stop their operation in step S3. Such steps are similar to the conventional cool air exhaling apparatus of the refrigerator.

The cool air exhaling apparatus of the present invention is designed so that the cool air rarely flows outside due to the air curtain at the front of the shelf even if the cool air circulating fan is operating when the refrigerator door is open. Thus, even if the door is open in step S4, the compressor and the cool air circulating fan continuously operate because the temperature TR in the refrigerator is higher than the predetermined temperature TS. If the door is open in step S5 under the circumstances that the compressor and the cool air circulating fan stop their operations because the temperature TR of the refrigerator is lower than a predetermined temperature TS, the cool air circulating fan is only operated to form the air curtain in step S6 so as not to flow the cool air out of the refrigerator.

Furthermore, an air curtain mode selecting switch (not shown) is additionally formed in the refrigerator. Thus, the cool air circulating fan is operated to form the air curtain under the circumstances that the air curtain mode has been selected in step S7. If the air curtain mode has not been selected, the cool air circulating fan may stop its operation in step S3 and step S8 if the door is opened, as in the conventional control method of the conventional cool air exhaling apparatuses.

Figure 11:
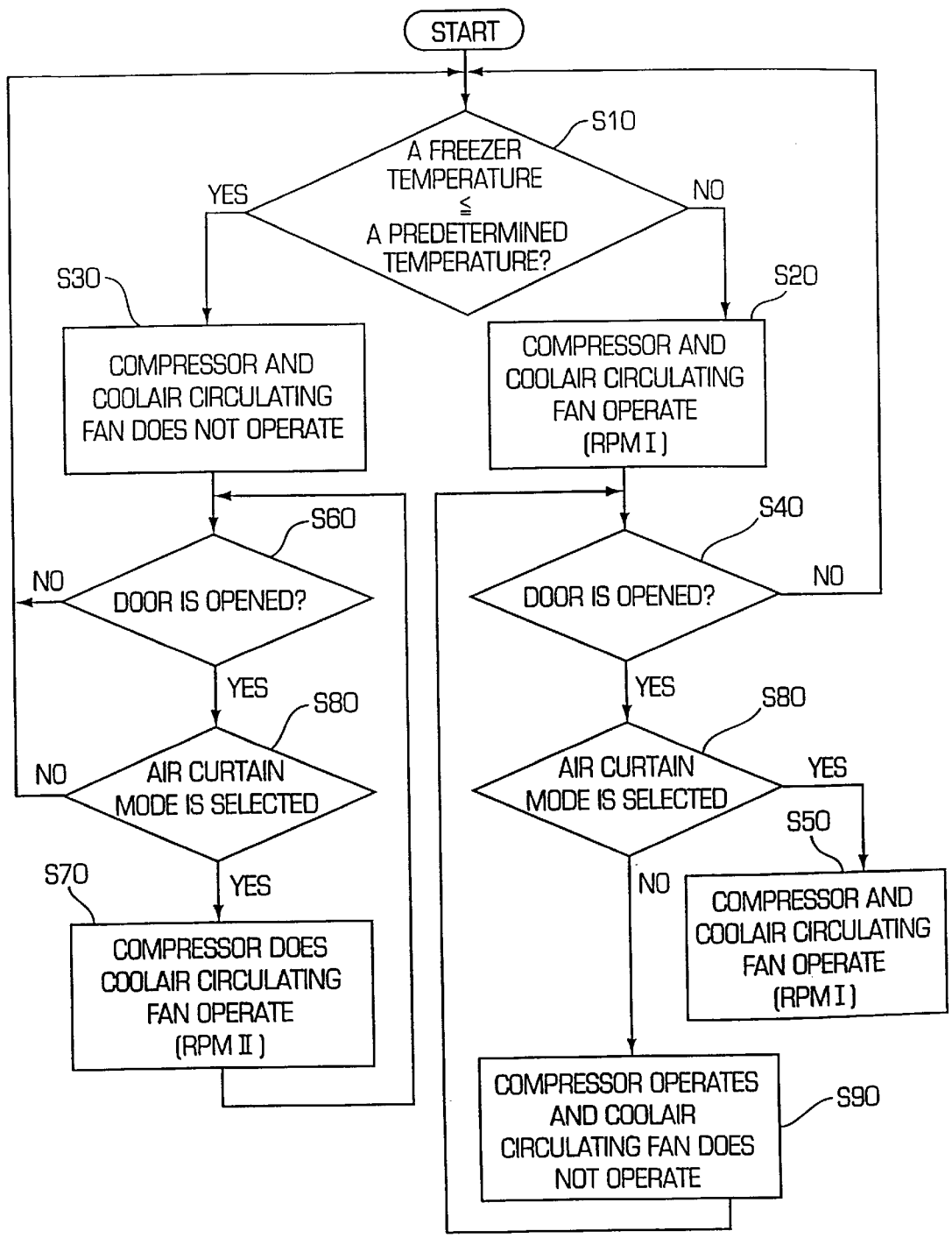
FIG. 11 is a flow chart illustrating the other embodiment of a control method of a cool air exhaling apparatus according to the present invention.

FIG. 11 is a flow chart illustrating the other embodiment of a control method of a cool air exhaling apparatus according to the present invention. In this embodiment, the cool air circulating fans 6 and 6' have their rotation speed of two steps, i.e., low speed having a general flow of the cool air and high speed for forming the air curtain at the front of the shelf.

First, the temperature TR in the refrigerator is sensed and then is compared with the predetermined temperature TS in step S10. If the temperature TR in the refrigerator is higher than the predetermined temperature TS, the compressor is operated and, at the same time, the cool air circulating fan is operated at low speed RPM I in step S20. If the temperature in the refrigerator is lowered to the predetermined temperature, the compressor and the cool air circulating fan stop their operations in step S30.

If the door is open in step S40 while the compressor and the cool air circulating fan are operating, because the temperature TR in the refrigerator is higher than the predetermined temperature TS, the cool air circulating fan is operated at high speed RPM II in step S50 to form the air curtain in step S50. If the door is open in step S60 when the compressor and the cool air circulating fan are not operating because the temperature TR in the refrigerator is lower than the predetermined temperature TS, the cool air circulating fan is only operated to form the air curtain in step S70 so as not to flow the cool air outside of the refrigerator.

Furthermore, the air curtain mode selecting switch (not shown) is additionally formed in the refrigerator. Thus, the cool air circulating fan is operated at high speed to form the air curtain under the circumstances that the air curtain mode has been selected in step S80. If the air curtain mode has not been selected in step 80, the cool air circulating fan stops its operation in the event of opening the door as in the conventional control method of the cool air exhaling apparatus.

As aforementioned, the cool air exhaling apparatus in the refrigerator and the control method thereof according to the present invention have the following advantages.

Since the cool air flows desirably through the cool air exhaling hollow and the cool air guide hollow without any separation and goes down in the vertical direction at the front of the shelf so as to form the air curtain, the cool air rarely flows out even if the door is open in the course of operating the cool air circulating fan. Thus, the cool air exhaling apparatus can have a simple configuration. This reduces the manufacturing costs and improves productivity. In addition, since the cool air circulating fan is continuously operated even if the door is open, it is possible to improve freezing and refrigerating efficiency of foods.

It will be apparent to those skilled in the art that various modifications and variations can be made in the cool air exhaling apparatus in the enforced circulation type refrigerator and the control method thereof according to the present invention without departing from the spirit or scope of the invention. Thus, it is intended that the present invention cover the modifications and variations of the invention provided they come within the scope of the appended claims and their equivalents.

What is claimed is:

1. A control method of a cool air exhaling apparatus in an enforced circulation type refrigerator in which a cool air cooled by an evaporator is guided to a duct by operating a cool air circulating fan and is exhaled into the refrigerator through a cool air exhaling hollow formed in a duct cover, wherein at least one cool air guide having a cool air exhaling hollow in an inner sidewall is formed protrusively at the front of said duct cover along a width direction of the refrigerator, and a duct thermal insulation material has a cool air guide hollow formed in sides of said duct cover so that the cool air flows down at the front of the refrigerator, said cool air guide hollow having a convex curved side portion connected to the inner sidewall of said cool air guide, the control method comprising the steps of:

sensing a temperature in the refrigerator;

turning off a compressor and said cool air circulating fan if the temperature in the refrigerator is lower than a predetermined temperature;

turning on said compressor and said cool air circulating fan if the temperature in the refrigerator is higher than the predetermined temperature; and turning on said cool air circulating fan regardless of the temperature in the refrigerator in the event' of opening a door of the refrigerator.

2. The control method of a cool air exhaling apparatus in an enforced circulation type refrigerator as claimed in claim 1, further comprising the step of selecting an air curtain mode, wherein said cool air circulating fan is turned on regardless of the temperature in the refrigerator in the event of opening the door when the air curtain mode has been selected, and said cool air circulating fan is turned off regardless of the temperature in the refrigerator in the event of opening the door when the air curtain mode has not been selected.

3. A control method of a cool air exhaling apparatus in an enforced circulation type refrigerator in which a cool air, cooled by an evaporator, is guided to a duct by operating a cool air circulating fan and is exhaled into the refrigerator through a cool air exhaling hollow formed in a duct cover, wherein at least one cool air guide having a cool air exhaling hollow in its inner sidewall is formed protrusively at the front of a duct cover in a width direction of the refrigerator, a duct thermal insulation material has a cool air guide hollow formed in sides of said duct cover, said cool air guide hollow having a convex curved side portion connected to an inner sidewall of said cool air guide, wherein a rotation speed of said cool air circulating fan is variable between a first rotation speed and a second rotation speed, said second rotation speed higher than said first rotation speed, and the cool air exhaled from said cool air exhaling hollow flows down at the front of the refrigerator if said cool air circulating fan is operated at said second rotation speed, the control method comprising the steps of:

sensing a temperature in the refrigerator;

turning off a compressor and said cool air circulating fan if the temperature in the refrigerator is lower than a predetermined temperature;

turning on said compressor and operating said cool air circulating fan at said first rotation speed if the temperature in the refrigerator is higher than the predetermined temperature; and operating said cool air circulating fan at said second rotation speed regardless of the temperature in the refrigerator in the event of opening a door of the refrigerator.

4. The control method of a cool air exhaling apparatus in an enforced circulation type refrigerator as claimed in claim 3, further comprising the step of selecting an air curtain mode, wherein said cool air circulating fan is operated at said second rotation speed regardless of the temperature in the refrigerator in the event of opening the door when the air curtain mode has been selected, and said cool air circulating fan is turned off regardless of the temperature in the refrigerator in the event of opening the door when the air curtain mode has not been selected.

* * * * *